US005435484A

United States Patent [19]

Carlson

[11] Patent Number: 5,435,484

[45] Date of Patent: Jul. 25, 1995

[54] SECURITY MAILBOX

[76] Inventor: Ronald G. Carlson, 10920 Eastside Dr., Oklahoma City, Okla. 73165

[21] Appl. No.: 185,337

[22] Filed: Jan. 24, 1994

[51] Int. Cl.[6] .................... B65G 11/04

[52] U.S. Cl. .................... 232/47; 232/17

[58] Field of Search .................... 232/17, 19, 24, 25, 232/28, 30, 31, 45, 47, 49, 50, 51, 43.1

[56] References Cited

U.S. PATENT DOCUMENTS

| | | | |
|---|---|---|---|
| 445,497 | 1/1891 | Catudyl | 232/17 |
| 518,924 | 4/1894 | Kinsey | 232/17 |
| 587,744 | 8/1897 | Leuschuer | 232/47 |
| 830,231 | 9/1906 | Homme | 232/47 |
| 1,527,223 | 2/1925 | Rastettler | 232/19 |
| 1,538,591 | 5/1925 | Rastettler | 232/19 |
| 3,735,919 | 5/1973 | Morgan | 232/17 |
| 3,802,619 | 4/1974 | Vanderveer | 232/17 |
| 4,724,999 | 2/1988 | Fitzgerald et al. | 232/17 |
| 4,993,626 | 2/1991 | Berry | 232/47 |
| 5,096,115 | 3/1992 | Hassan | 232/17 |
| 5,148,974 | 9/1992 | Clapper | 232/17 |

FOREIGN PATENT DOCUMENTS

| | | | |
|---|---|---|---|
| 54239 | 7/1911 | Switzerland | 232/47 |
| 12758 | of 1908 | United Kingdom | 232/47 |

*Primary Examiner*—Flemming Saether

*Attorney, Agent, or Firm*—Robert K. Rhea

[57] ABSTRACT

A mailbox formed by an upright hollow housing closed by a top door and having a trap door intermediate its height separating the hollow housing into an upper compartment and a lower compartment. The trap door forms a bottom for the upper compartment for supporting mail deposited therein. The top access door is gang connected with the trap door for opening and closing the hollow housing and moving the trap door from a closed position to a downward open position in sequence with the vertical movement of the access door. The housing wall is provided with an outlet door communicating with the lower compartment which is normally closed by a lockable door permitting authorized persons to remove mail or other articles falling by gravity into the lower compartment.

3 Claims, 2 Drawing Sheets

SECURITY MAILBOX

BACKGROUND OF THE INVENTION

This invention relates to improvements in deposit and collection receptacles, such as mailboxes, and more particularly to a security mailbox with a limited access storage compartment for the collection and retention of mail or other valuable items.

1. Field of the Invention

Conventional mailboxes, as used in the United States, have usually comprised a horizontal elongated mail receiving portion having a door at one end for the placement or retrieval of mail placed therein.

Such mailboxes have for many years involved the mounting of the mailbox along a curb or roadway or into the wall of the home for delivery and pick-up of mail. Mailboxes are typically accessible to delivery persons or the home owner for picking up their mail but are also generally accessible to unauthorized persons. Thus, leaving mail susceptible to theft, vandalism or lack of privacy when the home owner is gone from home for several days or more. Mail being delivered on a daily basis accumulates in the mailbox providing a signal or sign to unscrupulous individuals that the home owner is gone for an extended period, perhaps inducing vandalism of the home. While the home owner can request mail be withheld or authorize a trusted friend to collect mail in his absence, there are times when such a solution is impractical, for example, when the home-owner must leave the home on very short notice or forget to make such arrangement with the post office or a neighbor.

It is therefore desirable to have a mail or other valuable item receptacle which allows the delivery person to place the articles therein which moves by gravity to an inaccessible compartment accessible only by a key or person having a code to an access door therein.

This invention provides such a mail or valuable item receptacle.

2. Description of the Prior Art

The most pertinent prior patent is believed to be U.S. Pat. No. 3,735,919 issued May 29, 1973 to Morgan for MAILBOX. This patent discloses a vertically elongated mailbox having a permanent top cap and a top door for receiving or picking up mail including a bottom compartment having a lockable door. A trap door horizontally divides the mailbox to form the upper and lower compartments with a vertical pivotal rod within the top compartment secured to the top door which pivots about its vertical axis and rotates a laterally extending arm underlying the trap door and opens the trap door as the arm pivots and closes it when the top door is opened. When the top mail receiving door is closed by the delivery person the arm and roller pivots outwardly from under the trap door allowing the mail to fall by gravity into the lower compartment to be accessed by the homeowner through a keyed entry.

U.S. Pat. Nos. 4,724,999 issued Feb. 16, 1988 to Fitzgerald et al for SECURED MAILBOX and 5,096,115 issued Mar. 17, 1992 to Hassan for MAIL THEFT PREVENTIVE MAILBOX are considered to be good examples of the further state-of-the-art.

The Fitzgerald et al patent discloses a mailbox having a top partition which supports mail to be picked up by the mail person and a forward hinged trap door which is pivoted downwardly to for receiving mail to be picked up so that mail deposited by the mailman falls down a chute formed by the door and inside panel sections for preventing an unauthorized person reaching mail in the lower key-accessed compartment.

The Hassan patent discloses a mailbox with a top partition within vertically pivoting top doors supporting mail to be picked up. Mail deposited by the mailman is placed under that top partition which falls by gravity into the lower end of a key-accessed compartment to be retrieved by the homeowner.

This invention is believed distinctive over the above patents by providing a mail receiving housing having a top opening door gang connected a the lower trap door forming a horizontal partition in the housing which is closed upon opening the top access door and opens to allow mail placed on the trap door to fall by gravity into the lower depending end of the housing which is provided with a key-accessed door for removing mail.

SUMMARY OF THE INVENTION

A generally rectangular hollow housing is provided with a top door pivoting vertically about a horizontal axis for access to the interior of the housing.

Inwardly of the door, the housing is horizontally divided by a trap door gang connected with the access door which moves to a horizontal partition position within the housing when the access door is opened and which moves downwardly about a horizontal hinge axis when the access door is closed, thus, allowing mail placed on the trap door, when the access door is closed, to fall by gravity into the lower compartment of the housing.

The lower compartment wall is provided with a hingedly mounted keyed door for access to items deposited therein.

The principal object of this invention is to provide a mailbox or other article depository of relatively simple construction having a minimum of moving parts and economically feasible as a mailbox or other depository in which a key-access door is the only manner of obtaining items deposited therein.

DESCRIPTION OF THE PREFERRED EMBODIMENTS

Figure 1:
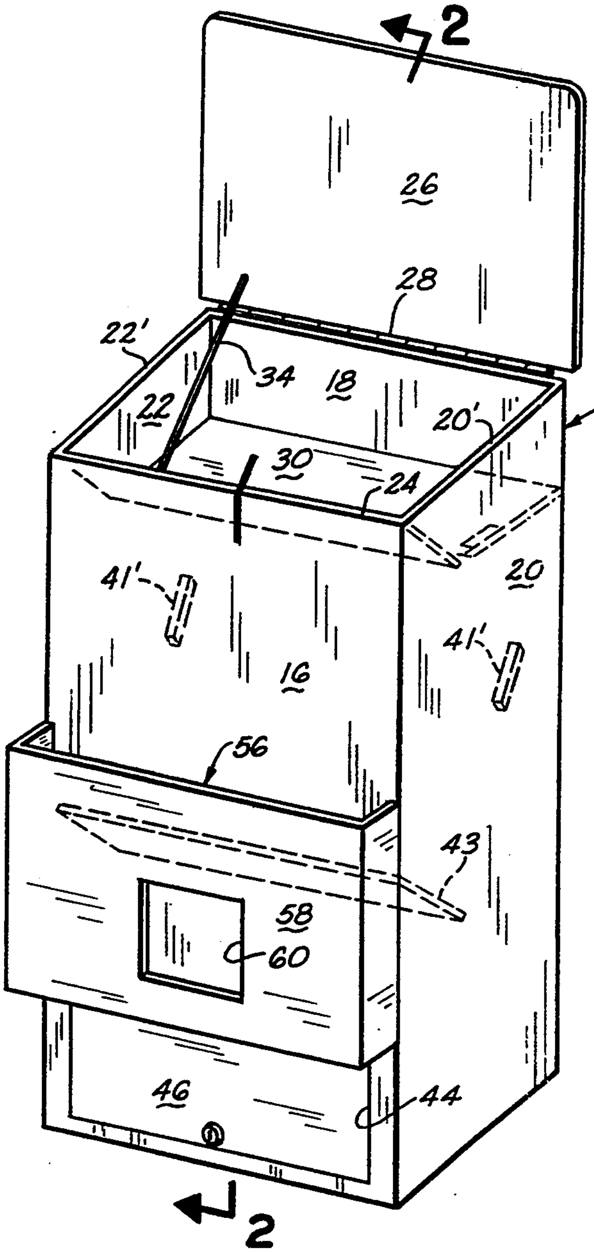
FIG. 1 is a perspective view of a preferred form of the mailbox.

Like characters of reference designate like parts in those figures of the drawings in which they occur.

Figure 2:
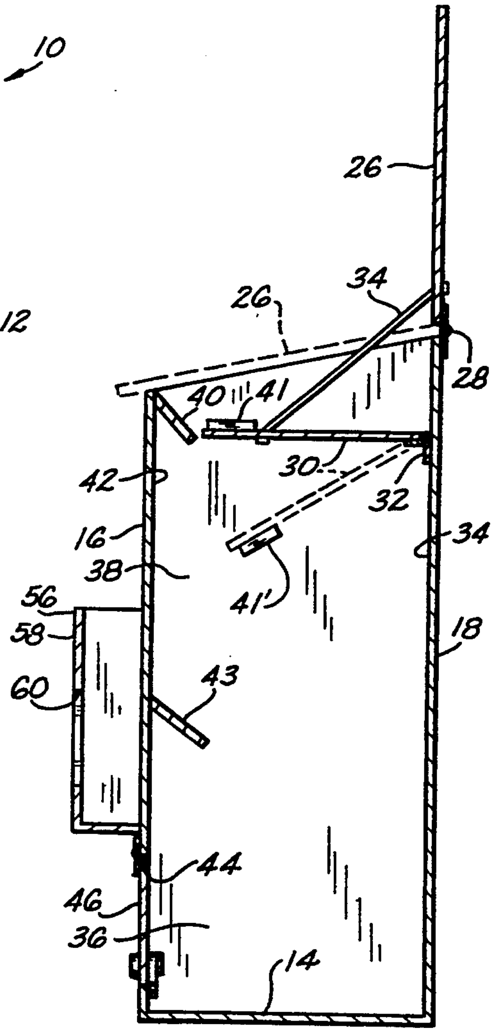
FIG. 2 is a vertical cross sectional view taken substantially along the line 2—2 of FIG. 1.
Figure 3:
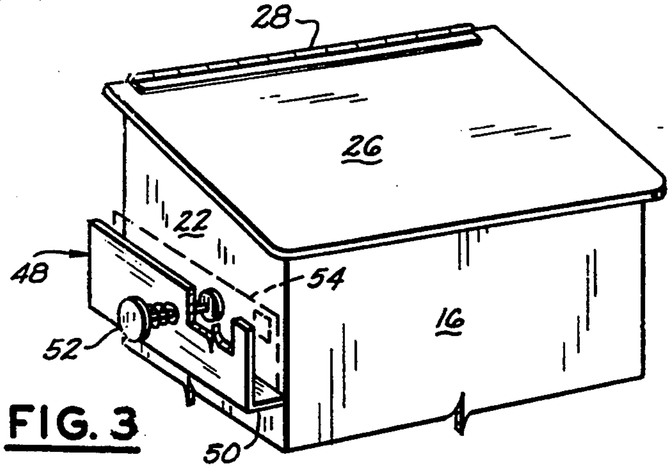
FIG. 3 is a fragmentary perspective view of the top portion of the mailbox of FIG. 1 with the access door in enclosed position.

In the drawings:

Referring first to FIGS. 1–3, the reference numeral 10 indicates the preferred embodiment of the mailbox comprising a rectangular elongated upright housing 12 having an open top and having a bottom wall 14 joined to parallel front and rearward walls 16 and 18 interconnected by side walls 20 and 22 to form a hollow housing.

The horizontal top edge 24 of the front wall 16 is disposed at a lower elevation than the upper limit of the rearward wall 18 and the respective top edge surface 20′ and 22′ of the respective side wall is inclined upwardly from the front wall top to the upper limit of the rearward wall.

A lid 26 having a perimeter dimensioned slightly greater than the upper limit of the housing 12 is hingedly connected, as at 28, to the upper limit of the rearward wall 18 for vertical pivoting movement about the horizontal axis of the hinge 28 in opening and closing the housing 12.

A rectangular trap door 30 is hingedly connected by one longitudinal edge, as at 32, to the inner surface 34 of the back wall at a selected distance spaced downwardly from the upper limit of the back wall.

A link or flexible member 34 interconnects the lid 26 with the trap door 30 in gang fashion so that when the lid is in its opened position (FIG. 2) the trap door 30 forms a horizontal partition dividing the hollow interior of the housing 12 into an upper compartment 38 and a larger lower compartment 36.

A rectangular upper baffle 40 is secured by one longitudinal edge to the inner surface 42 of the front wall adjacent its upper limit and is inclined downwardly and rearwardly so that its depending edge is disposed adjacent the forward edge of the trap door 30 when the latter is in closed position (FIG. 2).

Two pairs of upper and lower stops 41 and 41′ are secured in vertically spaced relation to the inner surfaces of the side walls 20 and 22 for limiting the vertical movement of the trap door 30. The top pair of the stops 41, only one being shown, are disposed in cooperative relation to limit upward movement of the trap door by the opening movement of the lid 26 and similarly the other pair of stops 41 are cooperatively disposed in position to contact the depending edge surface of the trap door to limit its downward movement when the lid 26 is closed as illustrated by the dotted lines (FIG. 2).

An upwardly open magazine or newspaper rack 56 is attached to the forward surface of the front wall 16 intermediate its height. The front wall 58 of the rack 56 has an aperture 60 for revealing any small item deposited in the rack 56.

The housing front wall 16, at its depending end, is provided with an access opening 44 normally closed by a lockable access door 46. A similar second baffle 43 is similarly connected by one longitudinal edge to the inner surface 42 of the front wall 16 intermediate its height and extends downwardly and rearwardly. The baffles 40 and 43, in combination with the trap door 30 when in its downward position, provide an impediment against an unauthorized person attempting to retrieve mail deposited in the lower compartment 36.

An L-shaped bracket 48 is secured by its foot portion 50 to the outer surface of the side wall 22 adjacent its upper limit for forming an upwardly open slot having a spring urged plunger 52 extending through its leg portion to impinge mail 54, to picked up by the mail carrier, against the outer surface of the housing wall 22.

Figure 4:
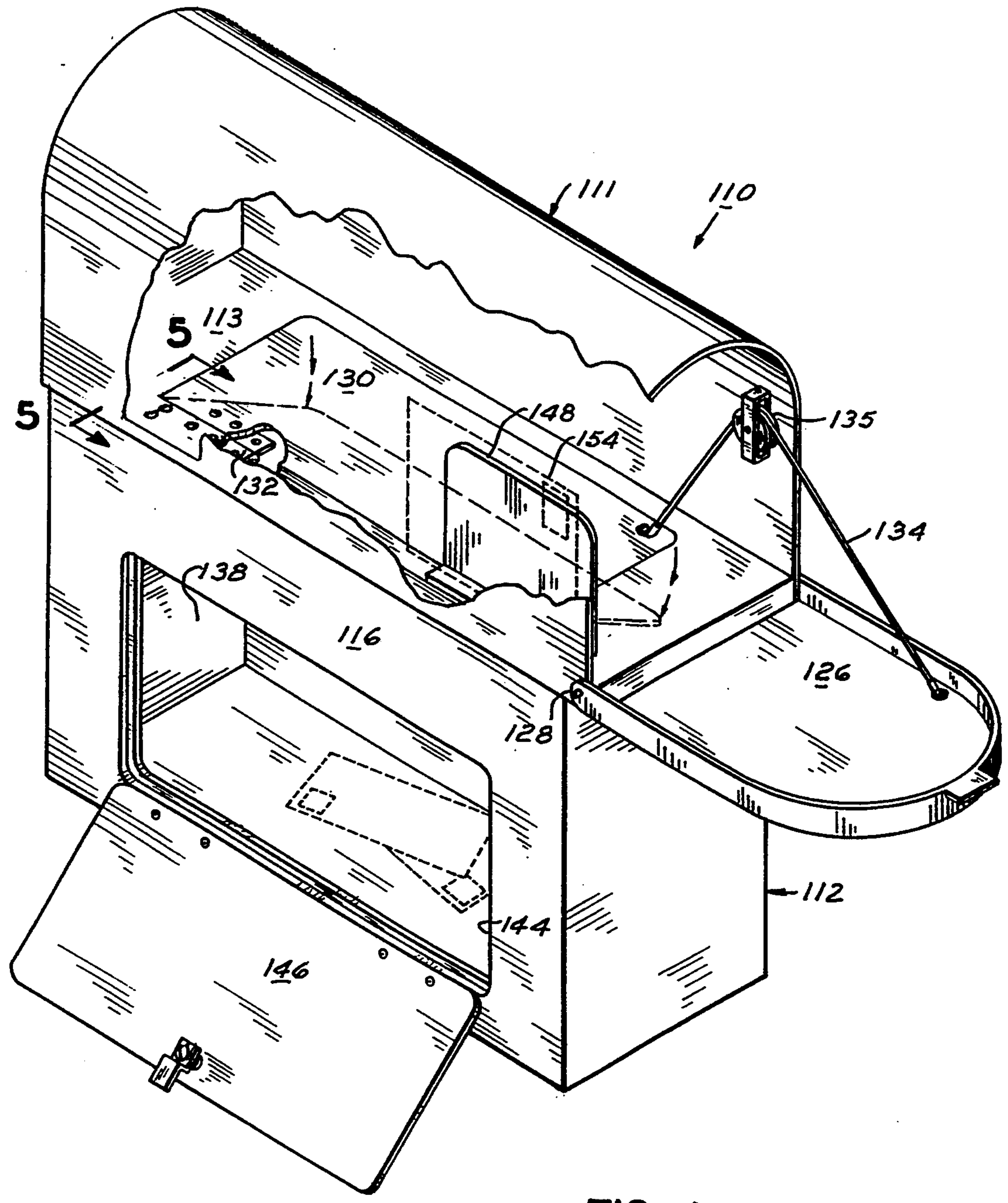
FIG. 4 is a fragmentary perspective view of another embodiment of the mailbox with a portion of the wall broken away for clarity; and, FIG. 5 is a fragmentary vertical cross sectional view taken substantially along the line 5—5 of FIG. 4.
Figure 5:
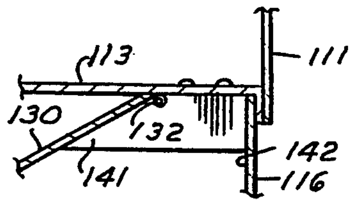

Referring also to FIGS. 4 and 5, the reference numeral 110 indicates another embodiment of the mailbox comprising a conventional type rural mailbox 111 having a rectangular hollow housing 112 secured to the bottom 113 of the mailbox.

The bottom 113 is centrally apertured to form a trap door 130 hingedly connected to a lateral portion of the bottom 113 by hinges 132, only one being shown.

The mailbox 111 is conventionally provided with a front opening door 126 pivoting vertically about the axis of a hinge pin 128.

The trap door 130 is gang connected with the door 126 by a flexible connector 134 extending over a pulley 135 secured to the inner wall surface of the mailbox so that the trap door 130 is in closed position when the door 126 is open and vise versa. The trap door falls by gravity to its dotted line position when the door 126 is closed so that any mail deposited on the trap door falls by gravity into the lower compartment 138.

A stop 141 secured to the inner wall surface 142 of the housing front wall 116 has an inclined surface which supports the trap door 130 when in downwardly inclined open position.

The lower compartment side wall 116 is similarly provided with an aperture 144 opened and closed by a key entry access door 146.

An L-shaped letter holder 148 is positioned on an edge portion of the mailbox bottom or floor 113, opposite the pulley 135, for supporting mail 154 to be picked up by the mail carrier.

Obviously the invention is susceptible to changes or alterations without defeating its practicability. Therefore, I do not wish to be confined to the preferred embodiment shown in the drawings and described herein.

I claim:

1. A mailbox, comprising:

an upright hollow housing having front, back and side walls for defining an upper area for deposit of incoming mail and having a lower area receiving incoming mail from the upper area by gravity;

an access door hingedly connected with the housing for opening and closing the upper area;

a trap door hingedly connected with the housing back wall for dividing the upper area from the lower area and initially supporting mail deposited thereon;

a flexible member connecting said trap door with said access door for vertical pivoting movement in unison of said doors about respective horizontal axis such that the trap door pivots between closed and opened positions; and, a pair of baffles secured in vertical spaced relation to said housing front wall and projecting downwardly and rearwardly toward the back wall within the housing, the uppermost baffle of said pair of baffles cooperating with the trap door, when the trap door is in the closed position, to divide the upper area from the lower area, and forming in combination with the other baffle of said pair of baffles and the trap door, when the trap door is in a partially opened position, an impediment preventing unauthorized access to articles deposited in the housing lower area.

2. The mailbox according to claim 1 in which one wall of the housing is provided with an outlet opening and further including:

a door having a key operated lock hingedly secured, opposite the position of the key operated lock, to said one housing wall adjacent the outlet opening for opening and closing the outlet opening.

3. The mailbox according to claim 2 and further including:

upper and lower pairs of vertically spaced stops secured to the respective said end walls within said housing for limiting the magnitude of opening movement of said access door and the vertical pivoting movement of said trap door.

* * * * *